United States Patent
Lee et al.

(10) Patent No.: US 12,494,719 B2
(45) Date of Patent: Dec. 9, 2025

(54) METHOD FOR CONTROLLING SYNCHRONOUS RECTIFIER FOR POWER SUPPLY DEVICE AND APPARATUS FOR SAME

(71) Applicant: POWER LSI CO., LTD., Daejeon (KR)

(72) Inventors: Won Tae Lee, Bucheon-si (KR); Won Ji Lee, Daejeon (KR); Chuen Sik Jung, Suwon-si (KR); Gyu Won Lee, Guri-si (KR)

(73) Assignee: POWER LSI CO., LTD., Daejeon (KR)

( * ) Notice: Subject to any disclaimer, the term of this patent is extended or adjusted under 35 U.S.C. 154(b) by 0 days.

(21) Appl. No.: 18/550,686

(22) PCT Filed: Jul. 7, 2022

(86) PCT No.: PCT/KR2022/009820
§ 371 (c)(1),
(2) Date: Sep. 15, 2023

(87) PCT Pub. No.: WO2023/058849
PCT Pub. Date: Apr. 13, 2023

(65) Prior Publication Data
US 2024/0154538 A1    May 9, 2024

(30) Foreign Application Priority Data
Oct. 8, 2021    (KR) .................. 10-2021-0134120

(51) Int. Cl.
*H02M 3/335*        (2006.01)
*H02M 1/00*         (2007.01)
(Continued)

(52) U.S. Cl.
CPC ....... *H02M 3/33592* (2013.01); *H02M 1/007* (2021.05); *H02M 3/01* (2021.05);
(Continued)

(58) Field of Classification Search
CPC ...... H02M 1/0032; H02M 1/007; H02M 1/32; H02M 3/01; H02M 3/33592; H02M 3/33571; H02M 1/4208
See application file for complete search history.

(56) References Cited

U.S. PATENT DOCUMENTS 9,479,067 B2    10/2016    Gong et al.
10,003,210 B2    6/2018    Kleinpenning et al.
(Continued)

FOREIGN PATENT DOCUMENTS

JP    2018-148737 A    9/2018
KR    10-1396664 A    5/2014
(Continued)

OTHER PUBLICATIONS

Korean Intellectual Property Office, Office Action for Application No. 10-2021-0134120, May 18, 2023.
(Continued)

*Primary Examiner* — Jue Zhang
(74) *Attorney, Agent, or Firm* — ZION IP; Byungwoong Park

(57) ABSTRACT

According to an embodiment of the present disclosure, a resonant convertor for a power supply device may comprise a synchronous rectifier comprising at least one MOSFET to convert an alternating current into a direct current; a circuit isolation device to receive a state signal from a component included in a first circuit module and to generate a first synchronous rectifier control signal based on the received state signal; a load state detection module to detect a state of a load stage included in a second circuit side and to generate (Continued)

a second synchronous rectifier control signal based on the detected state; and a synchronous rectifier control module to receive the first and the second synchronous rectifier control signals and to control the synchronous rectifier based on at least one of the first and the second synchronous rectifier control signals.

18 Claims, 10 Drawing Sheets

(51) Int. Cl.
  *H02M 1/32* (2007.01)
  *H02M 1/42* (2007.01)
  *H02M 3/00* (2006.01)
(52) U.S. Cl.
  CPC ...... *H02M 3/33571* (2021.05); *H02M 1/0032* (2021.05); *H02M 1/32* (2013.01); *H02M 1/4208* (2013.01)

(56) References Cited

U.S. PATENT DOCUMENTS

| | | | |
|---|---|---|---|
| 10,333,411 | B2 | 6/2019 | Dikken et al. |
| 10,931,204 | B1* | 2/2021 | Han ................. H02M 3/33507 |
| 2018/0152111 | A1 | 5/2018 | Tschirhart et al. |
| 2021/0184566 | A1* | 6/2021 | Usami ............... H02M 3/33592 |

FOREIGN PATENT DOCUMENTS

| KR | 10-2016-0058704 A | 5/2016 |
|---|---|---|
| KR | 20160070718 A | 6/2016 |
| KR | 10-2016-0098642 A | 8/2016 |
| KR | 10-2018-0013941 A | 2/2018 |

OTHER PUBLICATIONS

Notice of Allowance of KIPO for Korean application No. 10-2021-0134120 issued on Sep. 23, 2024.
Office Action of KIPO for Korean application No. 10-2021-0134120 issued on Mar. 14, 2024.

* cited by examiner

| EN1 | EN2 | SR Control |
|---|---|---|
| L | L | DISABLED |
| L | H | DISABLED |
| H | L | ENABLED |
| H | H | DISABLED |
| HIGH Z | HIGH Z | ENABLED |

1110-1 (row: H, L, ENABLED)
1110-2 (row: HIGH Z, HIGH Z, ENABLED)

FIG. 11

METHOD FOR CONTROLLING SYNCHRONOUS RECTIFIER FOR POWER SUPPLY DEVICE AND APPARATUS FOR SAME

TECHNICAL FIELD

The present disclosure proposes a method for controlling a synchronous rectifier for a power supply device and an apparatus for the method.

BACKGROUND ART

Resonant converters minimize switching losses by making a voltage or a current of a switch at a switching moment have a level of '0', and thus, have a high efficiency even at high frequencies. In a resonant converter, a resonant switch additionally comprises an inductor and a capacitor which cause resonance to the switch. Such converters were initially applied to power supply devices and inverters in aerospace and space fields, where small and light converters are required. Recently, resonant converters have been used in various industrial fields. In addition, a high frequency switch of a resonant converter is possible to perform zero voltage switching (ZVS) and zero current switching (ZCS) and this leads to a reduction of electromagnetic interference (EMI). Resonant converters are classified into series resonance converters, parallel resonance converters, and series/parallel resonance converters depending on resonance types.

As a conventional art of resonant converters, U.S. Pat. No. 10,333,411B2 may be referred to.

SUMMARY

Due to their dynamic characteristics, such resonant converters have problems as follows when they are applied to systems having great fluctuations in an input voltage (Vin) and in a load current.

First, when an input voltage is suddenly lowered, a synchronous rectifier control module (SR control module) on a second side cannot immediately react to this in terms of a switching operation, and thus, releases charges of an output capacitor, resulting in a low system efficiency.

In addition, even when a load stage of the second side is under a light-load condition, the system efficiency decreases due to an unnecessary gate drive of the SR control module.

Even when the load stage of the second side is under an overload condition, a MOSFET or the SR control module may break down due to an abnormal gate drive of the SR control module.

Further, an FET and the SR control module may break down due to a malfunction of the SR control module because of a power stabilization time (Soft-Start time) of the second side.

In order to prevent such problems, the present disclosure proposes a method for controlling a synchronous rectifier and an apparatus for the same.

Specifically, an embodiment of the present disclosure provides a resonant converter for a power supply device, comprising: a synchronous rectifier comprising at least one MOSFET to convert an alternating current into a direct current; a circuit isolation device to receive a state signal from a component included in a first circuit module and to generate a first synchronous rectifier control signal based on the received state signal; a load state detection module to detect a state of a load stage included in a second circuit module and to generate a second synchronous rectifier control signal based on the detected state; and a synchronous rectifier control module to receive the first and the second synchronous rectifier control signals and to control the synchronous rectifier based on at least one of the first and the second synchronous rectifier control signals.

According to an embodiment of the present disclosure, various problems due to dynamic characteristics of a resonant converter may be resolved.

Specifically, even when an input voltage is suddenly lowered, the SR control module may immediately react to it and perform a switching operation. Thus, the decrease of the system efficiency due to the release of charges of the output capacitor may be prevented.

In addition, since, in an abnormal state such as a light-load condition or an overload condition of the load stage of the second side, the SR control module does not drive the synchronous rectifier, the decrease of the system efficiency or breakdowns of the MOSFET or the SR control module may be prevented.

In addition to such effects, embodiments of the present disclosure may have other various effects. These effects will be described below with reference to the relevant embodiments.

BRIEF DESCRIPTION OF THE DRAWINGS

FIG. 11 is an example of a table showing corresponding relations of signals inputted in and outputted from an enable signal generator shown in FIG. 10 as an example.

DESCRIPTION OF EXEMPLARY EMBODIMENTS

Since below-described technologies may be variously modified and have various embodiment, hereinafter, some embodiments of the present disclosure will be illustrated in the figures and described in detail with reference to the accompanying figures. However, it should be noted that the below-described technologies are not limited to these embodiments, but include all modifications, equivalents or substitutes included in the relevant technological idea and the relevant technological scope.

Terms, such as 'first', 'second', 'A', 'B' or the like may be used to describe various components. However, these terms do not limit the components, but are used only for distinguishing one component from another. For example, without being out of the scope of the right of the below-described technology, a first component may be referred to as a second component and, in a similar way, a second component may be referred to as a first component. The term 'and/or' means a combination of the relevant descriptions or any one of the relevant descriptions. For example, the description 'A and/or B' may be interpreted as 'at least one of A and B'. In addition, the mark '/' may be interpreted as 'and' or 'or'.

In this specification, a term in a singular form may also mean a term in a plural form as long as there is no particular indication. It should be understood that the term 'comprise', etc. means the existence of the described characteristics, numbers, steps, operations, components, parts or their combinations, but does not mean the exclusion of the existence or the possibility of addition of other characteristics, numbers, steps, operations, components, parts or their combinations.

Before describing the drawings in detail, it should be clarified that the classification of the components in this specification is made only by their main functions. That is, it is possible that two or more below-described components may be combined as one component or one component may be divided into two or more components depending on their detailed functions. In addition, each of the below-described components may additionally perform, in addition to its own main functions, some or all functions that another component performs. Otherwise, some of its own main functions of each component may also be exclusively performed by another component.

In a method or an operational method, as long as any specific order is clearly indicated, steps for the method may be performed in an order different from the order in which the steps are described. That is, the steps may be performed in the order in which they are described, simultaneously, or in a reverse order.

Figure 1:
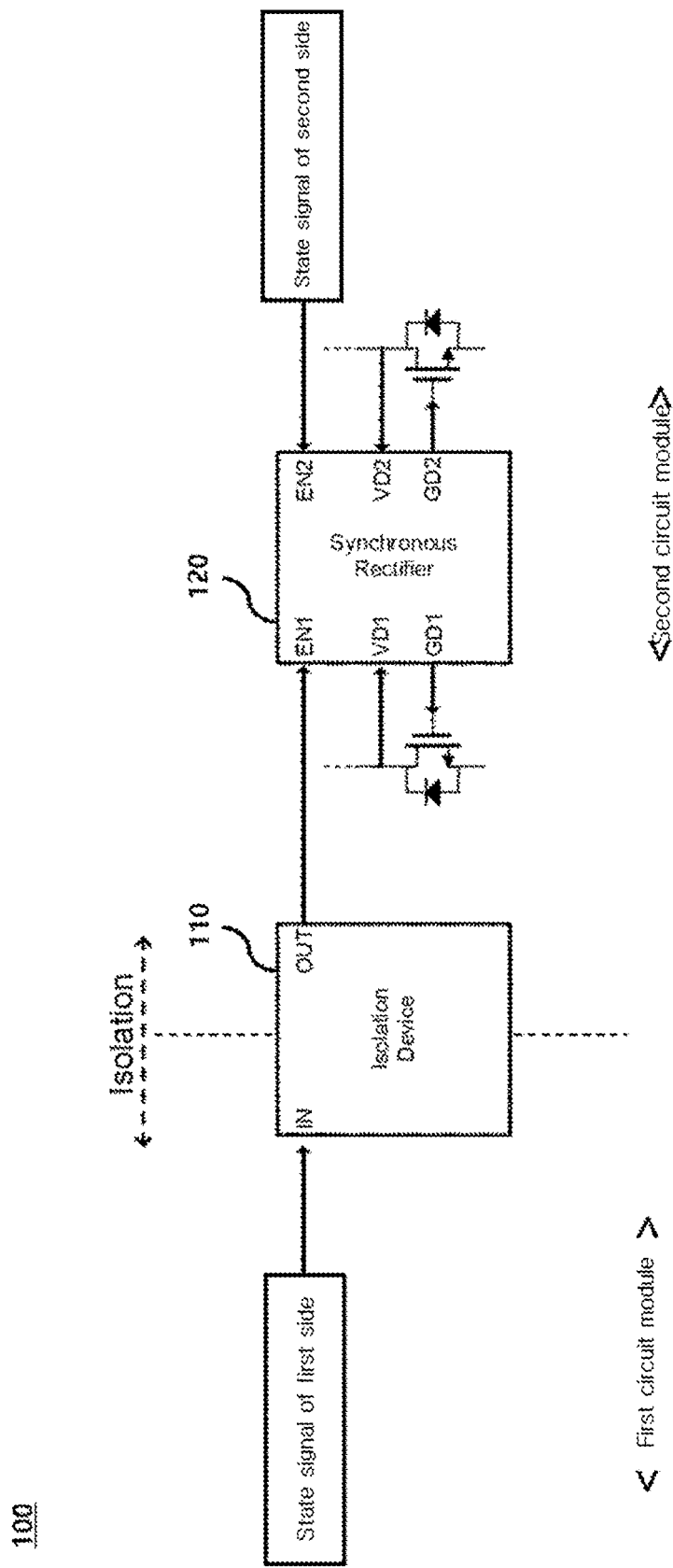
FIG. 1 is a block diagram for simply illustrating a resonant converter for a power supply device according to an embodiment of the present disclosure.

FIG. 1 is a block diagram for simply illustrating a resonant converter for a power supply device according to an embodiment of the present disclosure.

In order to overcome the limit of dynamic characteristics of conventional resonant converters, the present disclosure proposes a resonant converter 100 to continuously monitor a state of an internal circuit and to disable a synchronous rectifier when an abnormal state is detected.

To this end, the proposed resonant converter 100 may comprise a circuit isolation device 110 as a reference for dividing/isolating a first and a second circuit modules as shown in FIG. 1. The circuit isolation device may perform both the function of isolating the first and the second circuit modules, which have different grounds, and of transmitting a state signal of the first circuit module to the second circuit module.

The second circuit module may comprise a synchronous rectifier and a synchronous rectifier control module 120 to directly control the synchronous rectifier. The synchronous rectifier control module 120 may receive a first synchronous rectifier control signal generated based on a state signal of a first side (or a state signal of the first circuit module) and a second synchronous rectifier control signal generated based on a state signal of a second side (or a state signal of the second circuit module) and may control the synchronous rectifier based on these signals. In a case when any abnormal state in the first circuit module or the second circuit module is detected, the first and the second synchronous rectifier control signals may be generated as signals indicating a disabling of the synchronous rectifier and transferred to the synchronous rectifier control module 120. Accordingly, the synchronous rectifier control module 120 may overcome the limit of the dynamic characteristics by operating to enable the synchronous rectifier only in a normal state where no abnormal state is detected in the first and the second circuit modules.

The more specific structure and operation of the resonant converter 100 will be described below in detail with reference to FIG. 2.

Figure 2:
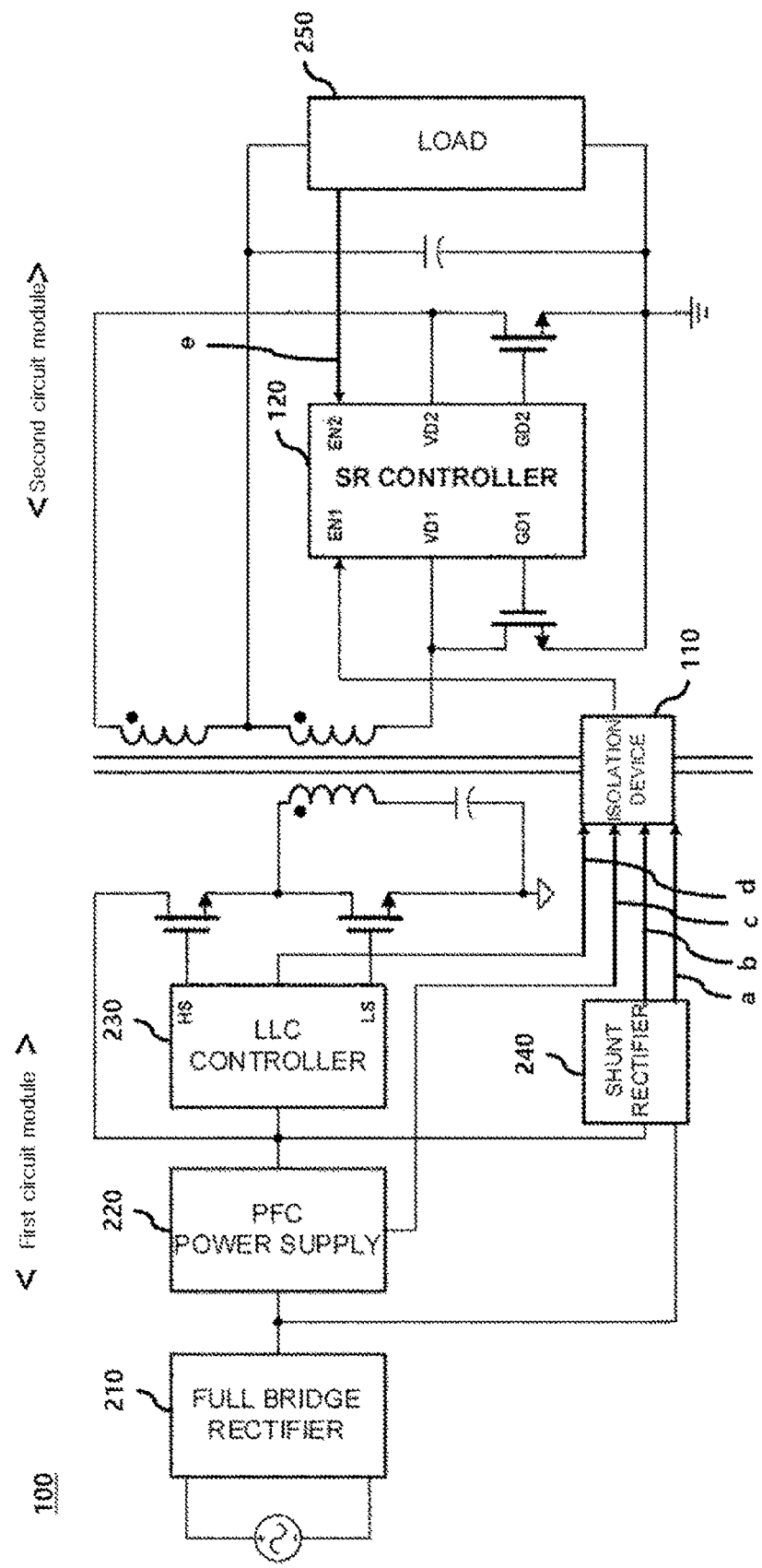
FIG. 2 is a block diagram for illustrating a resonant converter for a power supply device according to an embodiment of the present disclosure.

FIG. 2 is a block diagram for illustrating a resonant converter for a power supply device according to an embodiment of the present disclosure.

Referring to FIG. 2, the resonant converter 100 may be divided into a first circuit module and a second circuit module by a circuit isolation device 110.

The first circuit module may comprise/be provided with a full-wave bridge rectifier 210, a power factor correction (PFC) power supply module 220, an LLC control module 230 and/or a shunt rectifier 240.

The full-wave bridge rectifier 210 may rectify an input alternating current (AC) voltage inputted into the first circuit module.

The PFC power supply module 220 may generate a boosted direct current (DC) voltage for a first LLC operation of the resonant converter 100 by using a voltage rectified by the full-wave bridge rectifier 210.

The LLC control module 230 may correspond to a circuit control module to drive/control a MOSFET provided in the first circuit module of the resonant converter 100.

The shunt rectifier 110 may compare the level of an inputted voltage and the level of a predetermined first reference voltage and output a comparison result.

The circuit isolation device 110 may receive state signals of respective components 210-240 from the components included in the first circuit module and generate a first synchronous rectifier control signal for controlling the synchronous rectifier based on the received state signals. In addition, the circuit isolation device 110 may transmit the generated first synchronous rectifier control signal to the synchronous rectifier control module 120 provided in the second circuit module.

The second circuit module may comprise/be provided with the synchronous rectifier, the synchronous rectifier control module 120 and/or a load module 250.

The synchronous rectifier may comprise at least one MOSFET, which is a switching element, to convert an alternating current into a direct current.

The synchronous rectifier control module 120 may receive a control signal (for example, the first and/or the second synchronous rectifier control signals) for controlling the synchronous rectifier from another component provided in the resonant converter 100 and may control the synchronous rectifier based on the control signals. Here, the control signals for controlling the synchronous rectifier may be generated based on states of respective circuit modules/elements. For example, in a case when any abnormal state in any of circuit modules/elements occurs/is detected, a control signal for disabling the synchronous rectifier may be generated and transmitted to the synchronous rectifier control module 120. On the contrary, in a case when no abnormal state in any of circuit modules/elements occurs/is detected (or they are in a normal state), a control signal for enabling the synchronous rectifier may be generated and transmitted to the synchronous rectifier control module 120. These operations will be described in detail below with reference to FIG. 3 to FIG. 8.

In addition, the synchronous rectifier control module 120 may detect/monitor a drain voltage of the MOSFET provided in the synchronous rectifier and control the synchronous rectifier based on a detected/monitored result. Specifically, when a drain voltage signal has not been detected for a predetermined time as a result of monitoring a drain voltage of the MOSFET, the synchronous rectifier control module 120 may determine that an LLC switching operation has not been performed for the predetermined time and control the synchronous rectifier to be disabled/not to be driven. This operation will be described in detail below with reference to FIG. 12 and FIG. 13.

The load module 250 may comprise a load stage and/or a load state detection module. To the load stage, various components/systems using an output power voltage of the synchronous rectifier of the second side as power are connected and the load stage may correspond to an output side of the resonant converter 100. The load state detection module may detect a state of the load stage and generate a second synchronous rectifier control signal for controlling the synchronous rectifier based on the detected state. In addition, the load state detection module may transmit the generated second synchronous rectifier control signal to the synchronous rectifier control module 120.

Thus far, the entire structure and elements of the resonant converter 100 proposed in the present disclosure are described. Hereinafter, specific drives/enabling operations/methods/algorithms of the synchronous rectifier of the resonant converter 100 having such a structure and elements will be proposed. In particular, embodiments of drives/enablings of the synchronous rectifier corresponding respectively to signal transmitting paths a to e indicated in this figure will be described below.

Figure 3:
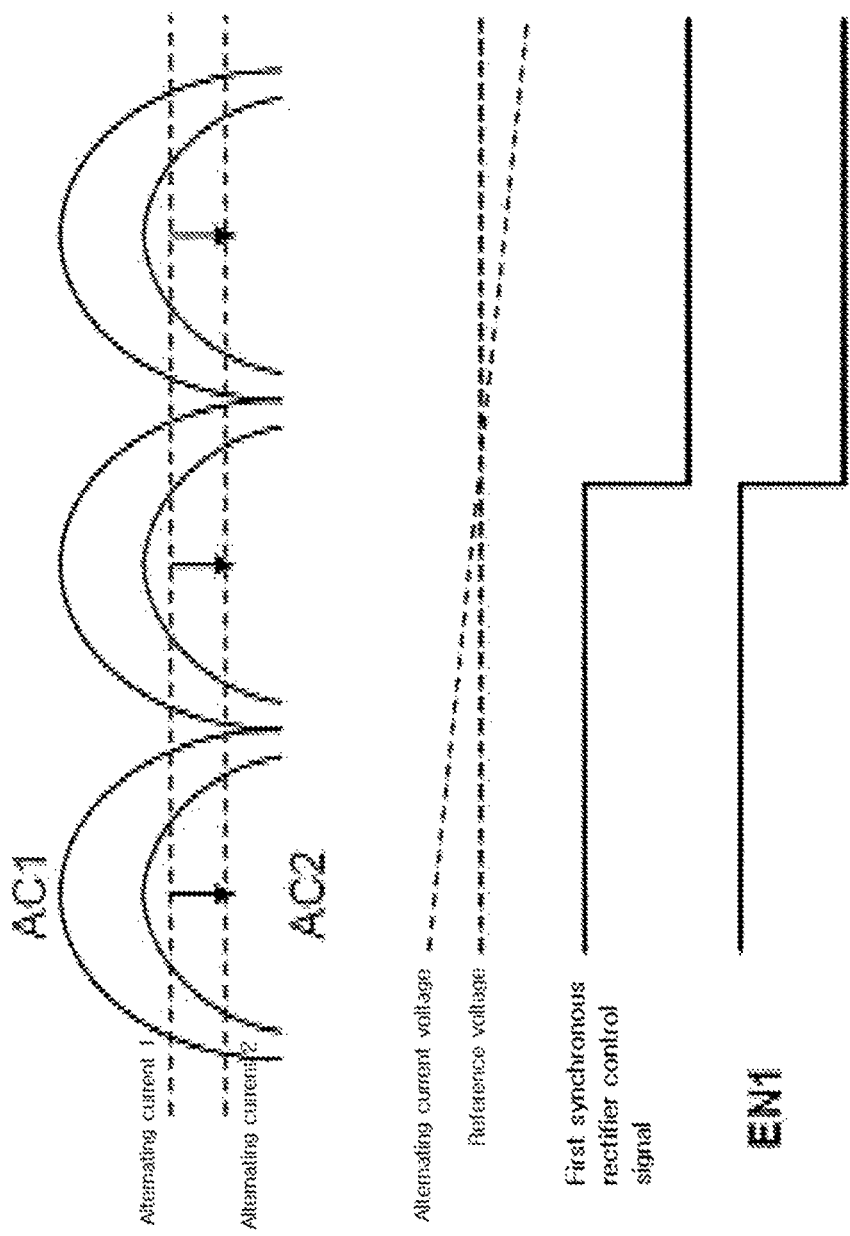
FIG. 3 is a waveform diagram of a disabling operation of a synchronous rectifier according to a first embodiment of the present disclosure.

FIG. 3 is a waveform diagram of a disabling operation of a synchronous rectifier according to a first embodiment of the present disclosure.

This corresponds to an embodiment of an enabling of the synchronous rectifier corresponding to the signal transmitting path a in FIG. 2.

Referring to FIG. 2 and FIG. 3, the full-wave bridge rectifier 210 may rectify an inputted alternating current voltage and output it to the shunt rectifier 240. The shunt rectifier 240 may sense (that is, a direct sensing) the level of the inputted rectified voltage (average/root mean square (RMS)) and compare the sensed level of the alternating current voltage with a predetermined first reference voltage level. The shunt rectifier 240 may transmit a comparison result as a state signal to the circuit isolation device 110.

The circuit isolation device 110 may generate a first synchronous rectifier control signal for controlling the synchronous rectifier based on the comparison result received from the shunt rectifier 240. Specifically, when the sensed level of the alternating current voltage is lower than the first reference voltage level as the comparison result, the circuit isolation device 110 may generate a first synchronous rectifier control signal (for example, logic low) indicating a disabling of the synchronous rectifier and output/transmit it to the synchronous rectifier control module 120 (see FIG. 3). Here, generation of the first synchronous rectifier control signal indicating a disabling of the synchronous rectifier may be interpreted/represented as an operation of turning off the first synchronous rectifier control signal indicating an enabling of the synchronous rectifier to be the first synchronous rectifier control signal indicating a disabling of the synchronous rectifier. On the contrary, when the sensed level of the alternating current voltage is equal to or higher than the first reference voltage level as the comparison result, the circuit isolation device 110 may generate a first synchronous rectifier control signal (for example, logic high) indicating an enabling of the synchronous rectifier and output/transmit it to the synchronous rectifier control module 120 (not shown). Here, generation of the first synchronous rectifier control signal indicating an enabling of the synchronous rectifier may be interpreted/represented as an operation of turning on the first synchronous rectifier control signal indicating a disabling of the synchronous rectifier to be the first synchronous rectifier control signal indicating an enabling of the synchronous rectifier.

The first synchronous rectifier control signal may be inputted in a first input terminal of the synchronous rectifier control module 120 as a first enable signal EN1 and function as a reference for determining an enabling/disabling of the synchronous rectifier along with the second synchronous rectifier control signal.

Figure 4:
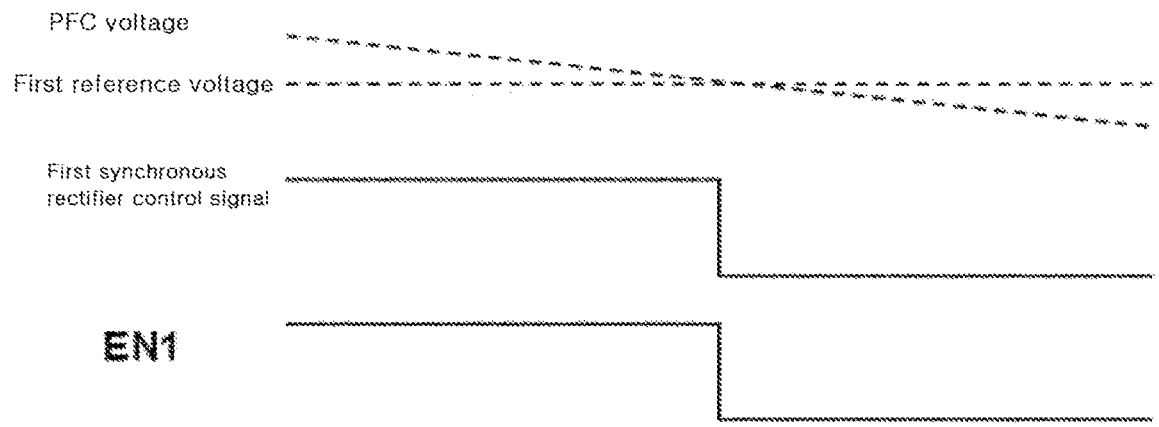
FIG. 4 is a waveform diagram of a disabling operation of a synchronous rectifier according to a second embodiment of the present disclosure.

FIG. 4 is a waveform diagram of a disabling operation of a synchronous rectifier according to a second embodiment of the present disclosure.

This corresponds to an embodiment of an enabling of the synchronous rectifier corresponding to a signal transmitting path b in FIG. 2.

Referring to FIG. 2 and FIG. 4, the PFC power supply module 220 may generate a direct current voltage by boosting a voltage rectified by the full-wave bridge rectifier 210 and output it to the shunt rectifier 240. The shunt rectifier 240 may sense the level of the inputted direct current voltage and compare the sensed level of the direct current voltage with the predetermined first reference voltage level. The shunt rectifier 240 may transmit a comparison result as a state signal to the circuit isolation device 110.

The circuit isolation device 110 may generate a first synchronous rectifier control signal for controlling the synchronous rectifier based on the comparison result received from the shunt rectifier 240. Specifically, when the sensed level of the direct current voltage is lower than the first reference voltage level as the comparison result, the circuit isolation device 110 may generate a first synchronous rectifier control signal (for example, logic low) indicating a disabling of the synchronous rectifier and output/transmit it to the synchronous rectifier control module 120 (see FIG. 4). Here, the generation of the first synchronous rectifier control signal indicating a disabling of the synchronous rectifier may be interpreted/represented as an operation of turning off the first synchronous rectifier control signal indicating an enabling of the synchronous rectifier to be the first synchronous rectifier control signal indicating a disabling of the synchronous rectifier. On the contrary, when the sensed level of the direct current voltage is equal to or higher than the first reference voltage level as the comparison result, the circuit isolation device 110 may generate a first synchronous rectifier control signal (for example, logic high) indicating an enabling of the synchronous rectifier and output/transmit it to the synchronous rectifier control module 120 (not shown). Here, the generation of the first synchronous rectifier control signal indicating an enabling of the synchronous rectifier may be interpreted/represented as an operation of turning on the first synchronous rectifier control signal indicating a disabling of the synchronous rectifier to be the first synchronous rectifier control signal indicating an enabling of the synchronous rectifier.

The first synchronous rectifier control signal may be inputted in the first input terminal of the synchronous rectifier control module 120 as the first enable signal EN1 and function as a reference for determining an enabling/disabling of the synchronous rectifier along with the second synchronous rectifier control signal.

Figure 5:
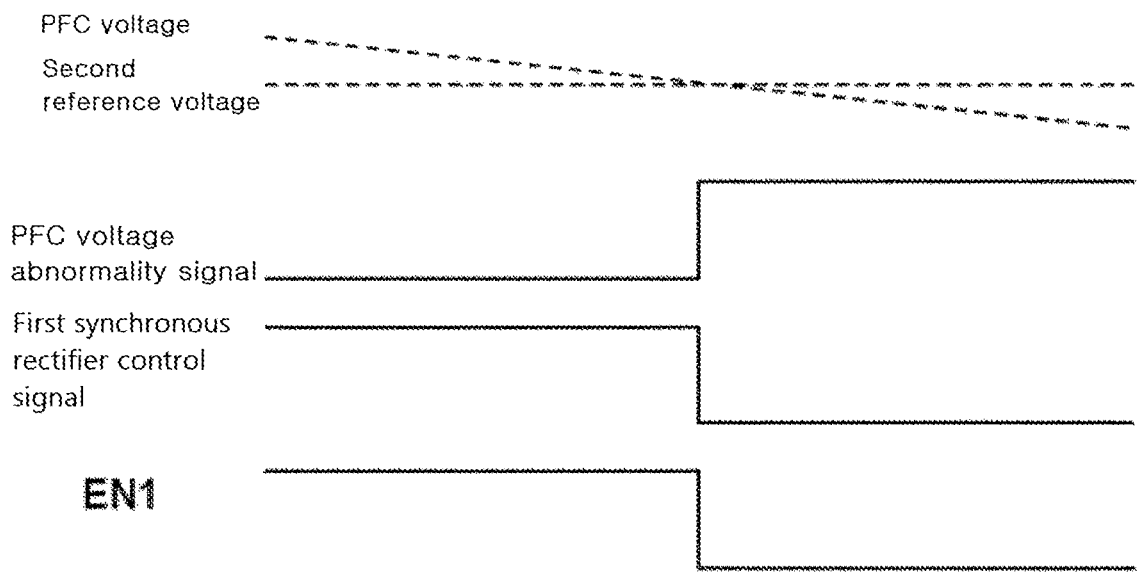
FIG. 5 is a waveform diagram of a disabling operation of a synchronous rectifier according to a third embodiment of the present disclosure.

FIG. 5 is a waveform diagram of a disabling operation of a synchronous rectifier according to a third embodiment of the present disclosure.

This corresponds to an embodiment of an enabling of the synchronous rectifier corresponding to a signal transmitting path d in FIG. 2.

Referring to FIG. 2 and FIG. 5, the LLC control module 230 may sense the level of a voltage outputted from the PFC power supply module 220, compare the level with the level of a predetermined second reference voltage inside the LLC control module 230, generate a signal indicating an abnormal state of the PFC power supply module 220 based on a comparison result, and transmit the signal to the circuit isolation device 110. Specifically, when the level of the voltage outputted from the PFC power supply module 220 is lower than the level of the second reference voltage as the comparison result, the LLC control module 230 may generate a signal indicating an abnormal state of the PFC power supply module 220 (for example, logic high) and transmit it to the circuit isolation device 110. Here, the generation of the signal indicating an abnormal state may be interpreted/represented as an operation of turning on a signal indicating a normal state of the PFC power supply module 220 to be the signal indicating an abnormal state thereof. On the contrary, when the level of the voltage outputted from the PFC power supply module 220 is equal to or higher than the second reference voltage level as the comparison result, the LLC control module 230 may generate, as a state signal, a signal indicating a normal state of the PFC power supply module 220 (for example, logic low) and transmit it to the circuit isolation device 110. Here, the generation of the signal indicating a normal state may be interpreted/represented as an operation of turning off the signal indicating an abnormal state of the PFC power supply module 220 to be a signal indicating a normal state thereof.

The circuit isolation device 110 may generate a first synchronous rectifier control signal based on the state signal received from the LLC control module 230 and transmit it to the synchronous rectifier control module 120. Specifically, when the circuit isolation device 110 receives the signal indicating an abnormal state of the PFC power supply module 220 from the LLC control module 230, the circuit isolation device 110 may generate a first synchronous rectifier control signal indicating a disabling of the synchronous rectifier (for example, logic low) and output/transmit it to the synchronous rectifier control module 120 (see FIG. 5). Here, the generation of the first synchronous rectifier control signal indicating a disabling of the synchronous rectifier may be interpreted/represented as an operation of turning off a first synchronous rectifier control signal indicating an enabling of the synchronous rectifier to be the first synchronous rectifier control signal indicating a disabling thereof. On the contrary, when the circuit isolation device 110 receives the signal indicating a normal state of the PFC power supply module 220 from the LLC control module 230, the circuit isolation device 110 may generate a first synchronous rectifier control signal indicating an enabling of the synchronous rectifier (for example, logic high) and output/transmit it to the synchronous rectifier control module 120 (not shown). Here, the generation of the first synchronous rectifier control signal indicating an enabling of the synchronous rectifier may be interpreted/represented as an operation of turning on a first synchronous rectifier control signal indicating a disabling of the synchronous rectifier to be the first synchronous rectifier control signal indicating an enabling thereof.

The first synchronous rectifier control signal may be inputted in the first input terminal of the synchronous rectifier control module 120 as the first enable signal EN1 and function as a reference for determining an enabling/disabling of the synchronous rectifier along with the second synchronous rectifier control signal.

Figure 6:
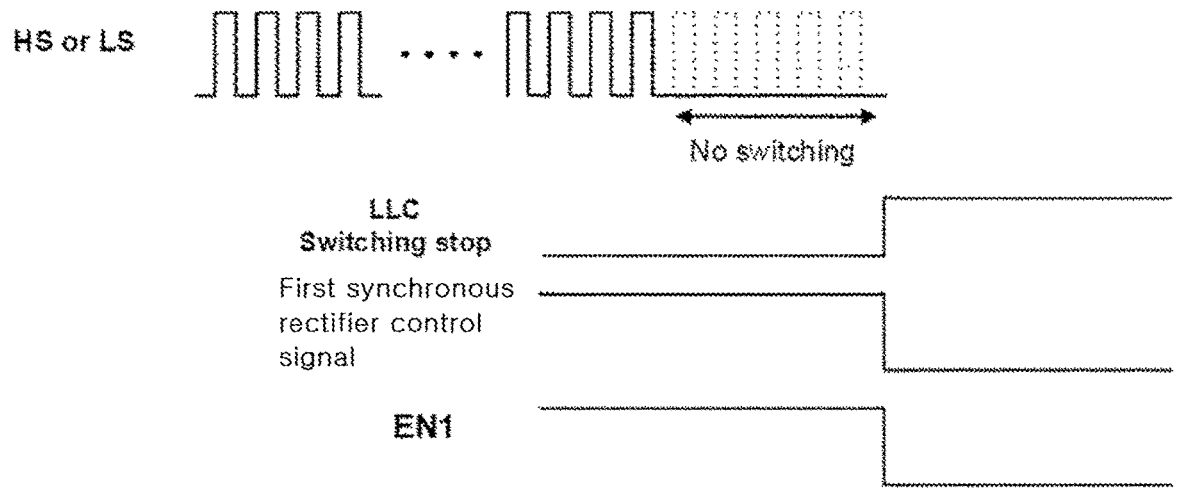
FIG. 6 is a waveform diagram of a disabling operation of a synchronous rectifier according to a fourth embodiment of the present disclosure.

FIG. 6 is a waveform diagram of a disabling operation of a synchronous rectifier according to a fourth embodiment of the present disclosure.

This corresponds to an embodiment of an enabling of the synchronous rectifier corresponding to a signal transmitting path c in FIG. 2.

Referring to FIG. 2 and FIG. 6, the LLC control module 230 may monitor an LLC switching operation and, when any abnormality is detected in the LLC switching operation, generate a signal indicating an abnormal state of the LLC control module 230 as a state signal and transmit it to the circuit isolation device 110. Specifically, when the LLC switching operation has not been performed for a predetermined time, the LLC control module 230 may generate a signal indicating an abnormal state of the LLC control module 230 (for example, logic high) as a state signal and transmit it to the circuit isolation device 110. Here, the generation of the signal indicating an abnormal state may be interpreted/represented as an operation of turning on a signal indicating a normal state of the LLC control module 230 to be the signal indicating an abnormal state thereof. On the contrary, when the LLC switching operation is performed within a predetermined time, the LLC control module 230 may generate a signal indicating a normal state of the LLC control module 230 (for example, logic low) as a state signal and transmit it to the circuit isolation device 110. Here, generation of the signal indicating a normal state may be interpreted/represented as an operation of turning off a signal indicating an abnormal state of the LLC control module 230 to be the signal indicating a normal state.

The circuit isolation device 110 may generate a first synchronous rectifier control signal based on the state signal received from the LLC control module 230 and transmit it to the synchronous rectifier control module 120. Specifically, when the circuit isolation device 110 receives a signal indicating an abnormal state of the LLC control module 230 from the LLC control module, the circuit isolation module 110 may generate a first synchronous rectifier control signal indicating a disabling of the synchronous rectifier (for example, logic low) and output/transmit it to the synchronous rectifier control module 120 (see FIG. 6). Here, the generation of the first synchronous rectifier control signal indicating a disabling of the synchronous rectifier may be interpreted/represented as an operation of turning off a first synchronous rectifier control signal indicating an enabling of the synchronous rectifier to be the first synchronous rectifier control signal indicating a disabling thereof. On the contrary, when the circuit isolation device 110 receives the signal indicating a normal state of the LLC control module 230 from the LLC control module 230, the circuit isolation device 110 may generate a first synchronous rectifier control signal indicating an enabling of the synchronous rectifier (for example, logic high) and output/transmit it to the synchronous rectifier control module 120 (not shown). Here, the generation of the first synchronous rectifier control signal indicating an enabling of the synchronous rectifier may be interpreted/represented as an operation of turning on a first synchronous rectifier control signal indicating a disabling of the synchronous rectifier to be the first synchronous rectifier control signal indicating an enabling thereof.

The first synchronous rectifier control signal may be inputted in the first input terminal of the synchronous rectifier control module 120 as the first enable signal EN1 and function as a reference for determining an enabling/disabling of the synchronous rectifier along with the second synchronous rectifier control signal.

Figure 7:
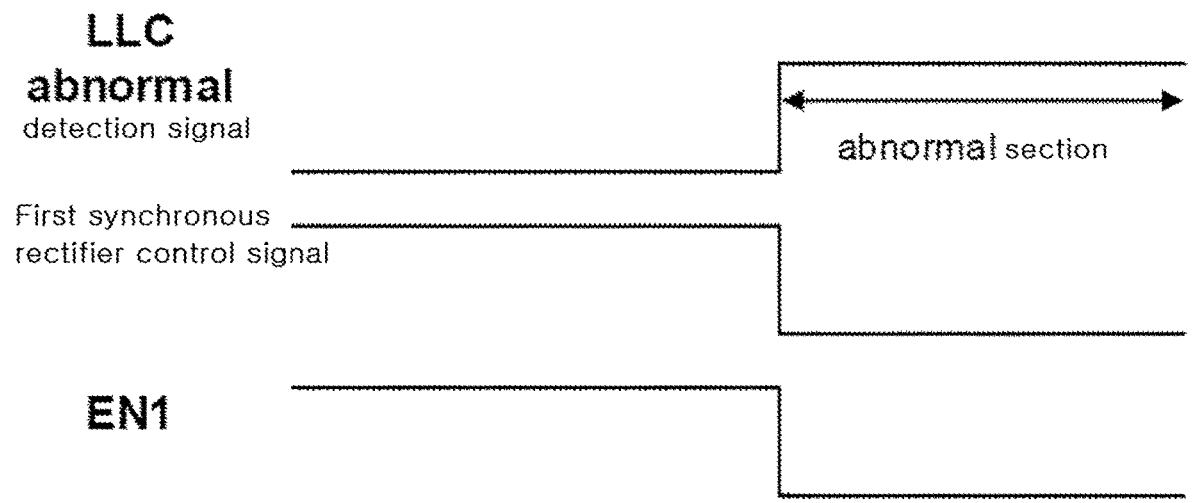
FIG. 7 is a waveform diagram of a disabling operation of a synchronous rectifier according to a fifth embodiment of the present disclosure.

FIG. 7 is a waveform diagram of a disabling operation of a synchronous rectifier according to a fifth embodiment of the present disclosure.

This corresponds to an embodiment of an enabling of the synchronous rectifier corresponding to a signal transmitting path c in FIG. 2.

Referring to FIG. 2 and FIG. 7, the LLC control module 230 may monitor its internal state. When any abnormality is detected, the LLC control module 230 may generate a signal indicating an abnormal state of the LLC control module 230 as a state signal and transmit it to the circuit isolation device 110. Here, the abnormal state may include/mean at least one of an overheating state, an overcurrent state and/or an overvoltage state of the LLC control module 230. When an abnormal state of the LLC control module 230 is detected, the LLC control module 230 may generate a signal indicating an abnormal state of the LLC control module 230 (for example, logic high) as a state signal and transmit it to the circuit isolation device 110. Here, the generation of the signal indicating an abnormal state may be interpreted/represented as an operation of turning on a signal indicating a normal state of the LLC control module 230 to be the signal indicating an abnormal state thereof. On the contrary, when an abnormal state of the LLC control module 230 is not detected, the LLC control module 230 may generate a signal indicating a normal state of the LLC control module 230 (for example, logic low) as a state signal and transmit it to the circuit isolation device 110. Here, the generation of the signal indicating a normal state may be interpreted/represented as an operation of turning off a signal indicating an abnormal state of the LLC control module 230 to be the signal indicating a normal state thereof.

The circuit isolation device 110 may generate a first synchronous rectifier control signal based on the state signal received from the LLC control module 230 and transmit it to the synchronous rectifier control module 120. Specifically, when the circuit isolation device 110 receives a signal indicating an abnormal state of the LLC control module 230 from the LLC control module 230, the circuit isolation module 110 may generate a first synchronous rectifier control signal indicating a disabling of the synchronous rectifier (for example, logic low) and output/transmit it to the synchronous rectifier control module 120 (see FIG. 7). Here, the generation of the first synchronous rectifier control signal indicating a disabling of the synchronous rectifier may be interpreted/represented as an operation of turning off a first synchronous rectifier control signal indicating an enabling of the synchronous rectifier to be the first synchronous rectifier control signal indicating a disabling thereof. On the contrary, when the circuit isolation device 110 receives the signal indicating a normal state of the LLC control module 230 from the LLC control module 230, the circuit isolation device 110 may generate a first synchronous rectifier control signal indicating an enabling of the synchronous rectifier (for example, logic high) and output/transmit it to the synchronous rectifier control module 120 (not shown). Here, the generation of the first synchronous rectifier control signal indicating an enabling of the synchronous rectifier may be interpreted/represented as an operation of turning on a first synchronous rectifier control signal indicating a disabling of the synchronous rectifier to be the first synchronous rectifier control signal indicating an enabling thereof.

The first synchronous rectifier control signal may be inputted in the first input terminal of the synchronous rectifier control module 120 as the first enable signal EN1 and function as a reference for determining an enabling/disabling of the synchronous rectifier along with the second synchronous rectifier control signal.

Figure 8:
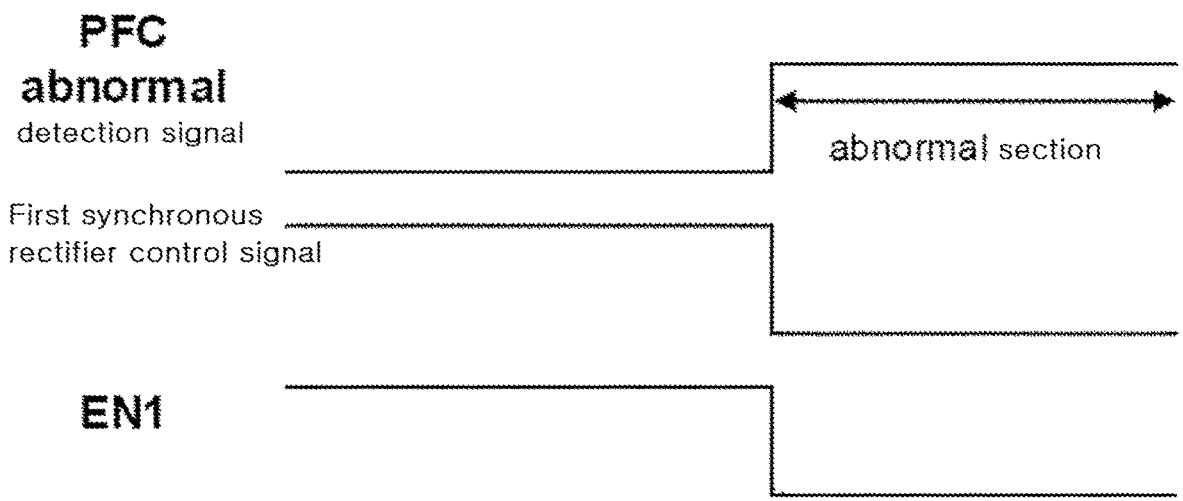
FIG. 8 is a waveform diagram of a disabling operation of a synchronous rectifier according to a sixth embodiment of the present disclosure.

FIG. 8 is a waveform diagram of a disabling operation of a synchronous rectifier according to a sixth embodiment of the present disclosure.

This corresponds to an embodiment of an enabling of the synchronous rectifier corresponding to a signal transmitting path d in FIG. 2.

Referring to FIG. 2 and FIG. 8, the PFC power supply module 220 may monitor its internal state. When any abnormality is detected, the PFC power supply module 220 may generate a signal indicating an abnormal state of the PFC power supply module 220 as a state signal and transmit it to the circuit isolation device 110. Here, the abnormal state may include/mean at least one of an overheating state, an overcurrent state and/or an overvoltage state of the PFC power supply module 220. When an abnormal state of the PFC power supply module 220 is detected, the PFC power supply module 220 may generate a signal indicating an abnormal state of the PFC power supply module 220 (for example, logic high) as a state signal and transmit it to the circuit isolation device 110. Here, the generation of the signal indicating an abnormal state may be interpreted/represented as an operation of turning on a signal indicating a normal state of the PFC power supply module 220 to be the signal indicating an abnormal state thereof. On the contrary, when the abnormal state of the PFC power supply module 220 is not detected, the PFC power supply module 220 may generate a signal indicating a normal state of the PFC power supply module 220 (for example, logic low) as a state signal and transmit it to the circuit isolation device 110. Here, the generation of the signal indicating a normal state may be interpreted/represented as an operation of turning off a signal indicating an abnormal state of the PFC power supply module 220 to be the signal indicating a normal state thereof.

The circuit isolation device 110 may generate a first synchronous rectifier control signal based on the state signal received from the PFC power supply module 220 and transmit it to the synchronous rectifier control module 120. Specifically, when the circuit isolation device 110 receives a signal indicating an abnormal state of the PFC power supply module 220 from the PFC power supply module 220, the circuit isolation module 110 may generate a first synchronous rectifier control signal indicating a disabling of the synchronous rectifier (for example, logic low) and output/transmit it to the synchronous rectifier control module 120 (see FIG. 8). Here, the generation of the first synchronous rectifier control signal indicating a disabling of the synchronous rectifier may be interpreted/represented as an operation of turning off a first synchronous rectifier control signal indicating an enabling of the synchronous rectifier to be the first synchronous rectifier control signal indicating a disabling thereof. On the contrary, when the circuit isolation device 110 receives the signal indicating a normal state of the PFC power supply module 220 from the PFC power supply module 220, the circuit isolation device 110 may generate a first synchronous rectifier control signal indicating an enabling of the synchronous rectifier (for example, logic high) and output/transmit it to the synchronous rectifier control module 120 (not shown). Here, the generation of the first synchronous rectifier control signal indicating an enabling of the synchronous rectifier may be interpreted/represented as an operation of turning on a first synchronous rectifier control signal indicating a disabling of the synchronous rectifier to be the first synchronous rectifier control signal indicating an enabling thereof.

The first synchronous rectifier control signal may be inputted in the first input terminal of the synchronous rectifier control module 120 as the first enable signal EN1 and function as a reference for determining an enabling/disabling of the synchronous rectifier along with the second synchronous rectifier control signal.

Figure 9:
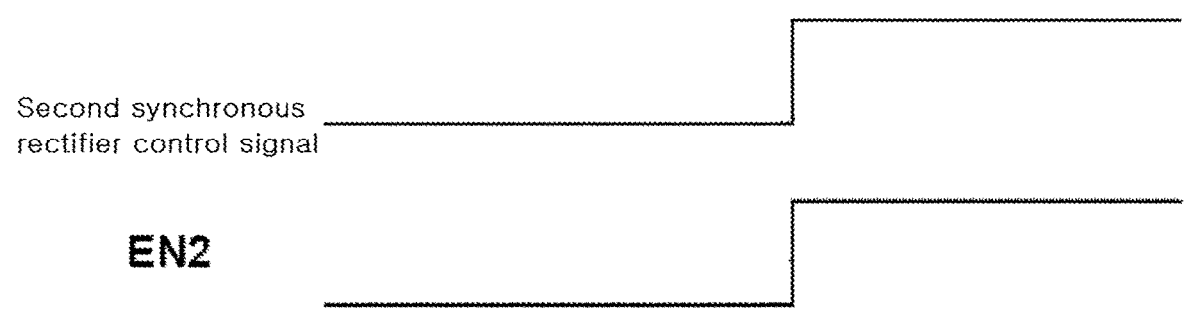
FIG. 9 is a waveform diagram of a disabling operation of a synchronous rectifier according to a seventh embodiment of the present disclosure.

FIG. 9 is a waveform diagram of a disabling operation of a synchronous rectifier according to a sixth embodiment of the present disclosure.

This corresponds to an embodiment of an enabling of the synchronous rectifier corresponding to a signal transmitting path e in FIG. 2.

Referring to FIG. 2 and FIG. 9, as an embodiment, the load state detection module may monitor a light-load state and/or an open state of the load stage. When the light-load state or an open state of the load stage is detected, the load state detection module may generate a second synchronous rectifier control signal indicating a disabling of the synchronous rectifier (for example, logic high) and transmit/output it to the synchronous rectifier control module 120 (see FIG. 9). On the contrary, when the light-load state or the open state is not detected, the load state detection module may generate a second synchronous rectifier control signal indicating an enabling of the synchronous rectifier (for example, logic low) and transmit/output it to the synchronous rectifier control module 120 (not shown).

As another embodiment, the load state detection module may detect an abnormal state of the load stage. When the abnormal state of the load stage is detected, the load state detection module may generate a second synchronous rectifier control signal indicating a disabling of the synchronous rectifier (for example, logic high) and transmit/output it to the synchronous rectifier control module 120 (see FIG. 9). Here, the abnormal state may include/mean at least one of an overheating state, an overcurrent state, a short-circuit state and/or an overvoltage state of the load stage. On the contrary, when the abnormal state of the load stage is not detected, the load state detection module may generate a second synchronous rectifier control signal indicating an enabling of the synchronous rectifier (for example, logic low) and transmit/output it to the synchronous rectifier control module 120 (not shown).

As still another embodiment, when receiving a signal for requesting a disabling of the synchronous rectifier from the load stage, the load state detection module may generate a second synchronous rectifier control signal indicating a disabling of the synchronous rectifier (for example, logic high) and transmit/output it to the synchronous rectifier control module 120 (see FIG. 9). On the contrary, when the load state detection module does not receive the signal for requesting a disabling of the synchronous rectifier from the load stage, the load state detection module may generate a second synchronous rectifier control signal indicating an enabling of the synchronous rectifier (for example, logic low) and transmit/output it to the synchronous rectifier control module 120 (not shown).

In the above-described embodiments, the generation of the second synchronous rectifier control signal indicating a disabling of the synchronous rectifier may be interpreted/represented as an operation of turning on a second synchronous rectifier control signal indicating an enabling of the synchronous rectifier to be the second synchronous rectifier control signal indicating a disabling thereof. On the contrary, the generation of the second synchronous rectifier control signal indicating an enabling of the synchronous rectifier may be interpreted/represented as an operation of turning off a second synchronous rectifier control signal indicating a disabling of the synchronous rectifier to be the second synchronous rectifier control signal indicating an enabling thereof.

The second synchronous rectifier control signal may be inputted in a second input terminal of the synchronous rectifier control module 120 as a second enable signal EN2 and function as a reference for determining an enabling/disabling of the synchronous rectifier along with the first synchronous rectifier control signal.

Figure 10:
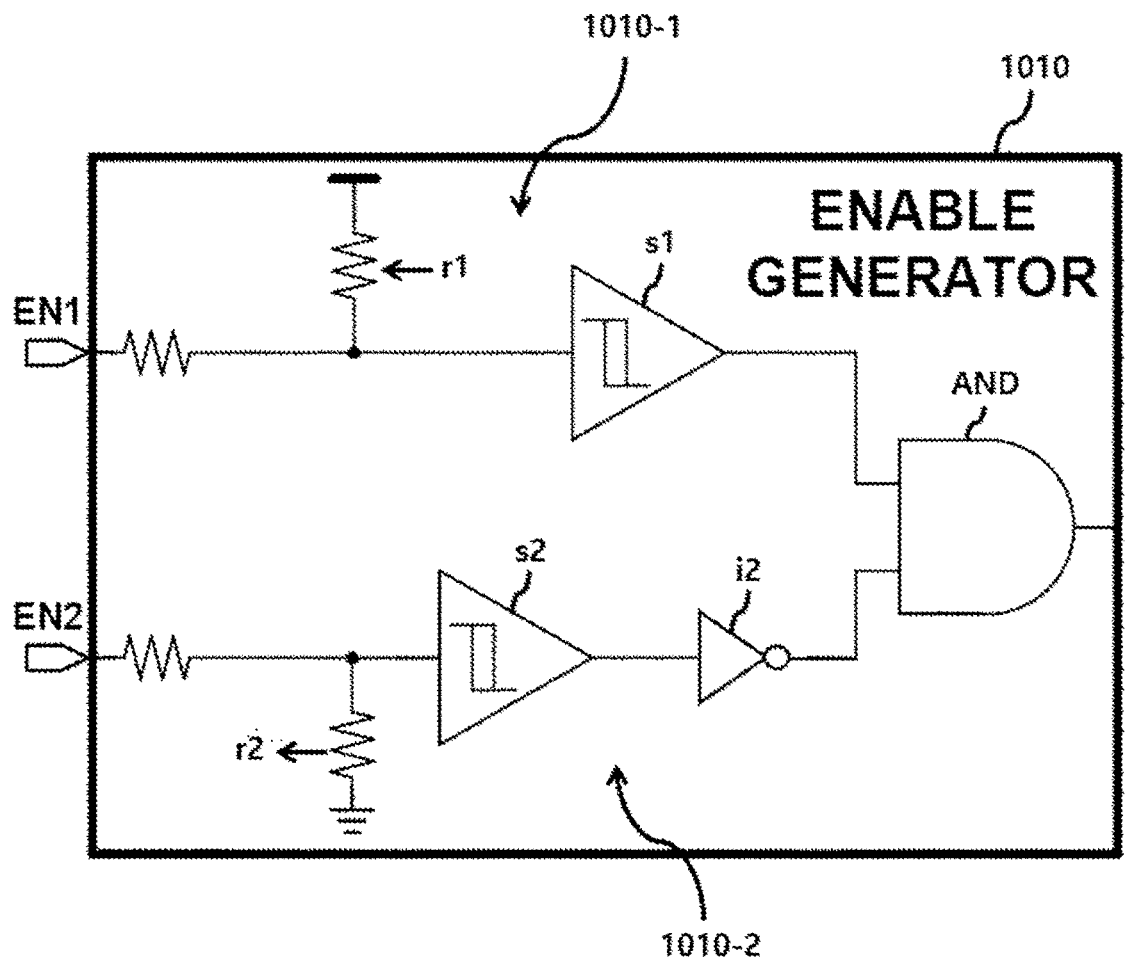
FIG. 10 is a logic circuit diagram of an enable signal generator included in a synchronous rectifier control module according to an embodiment of the present disclosure.

FIG. 10 is a logic circuit diagram of an enable signal generator included in a synchronous rectifier control module according to an embodiment of the present disclosure and FIG. 11 is an example of a table showing corresponding relations of signals inputted in and outputted from an enable signal generator shown in FIG. 10 as an example.

The synchronous rectifier control module may comprise an enable signal generator 1010 for outputting a control signal for controlling the synchronous rectifier based on the inputted first and second synchronous rectifier control signals (that is, the first and the second enable signals EN1, EN2). The enable signal generator 1010 may be a logic circuit made to output a signal for enabling the synchronous rectifier only when both the inputted first and second synchronous rectifier control signals EN1, EN2 indicate an enabling of the synchronous rectifier. In other words, when any one of the inputted first and second synchronous rectifier control signals EN1, EN2 indicates a disabling of the synchronous rectifier, the enable signal generator 1010 may output a signal for disabling the synchronous rectifier.

In a case when the first synchronous rectifier control signal EN1 indicating an enabling of the synchronous rectifier is set to be 'logic high' and the second synchronous rectifier control signal EN2 indicating an enabling of the synchronous rectifier is set to be 'logic low', the enable signal generator 1010 may comprise a first circuit path part, a second circuit path part 1010-1, 1010-2, and an AND logic part AND as shown in FIG. 10.

The first circuit path part 1010-1 may mean a circuit part through which the inputted first synchronous rectifier control signal EN1 passes and the second circuit path part 1010-2 may mean a circuit part through which the inputted second synchronous rectifier control signal EN2 passes. Output terminals of the first and second circuit path parts 1010-1, 1010-2 may be connected with an input terminal of the AND logic part AND and output signals of the first and second circuit path parts 1010-1, 1010-2 may be inputted into the AND logic part AND as input signals.

The first circuit path part 1010-1 may comprise a pull-up resistor r1 and a Schmitt trigger s1 and the second circuit path part 1010-2 may comprise a pull-down resistor r2, a Schmitt trigger s2, and an inverter i2.

According to an operation of the enable signal generator 1010 proposed in the present disclosure, it can be verified, as shown in FIG. 11, that, when both the first and second synchronous rectifier control signals EN1, EN2 indicate an enabling of the synchronous rectifier (that is, when the first synchronous rectifier control signal EN1 is 'logic high' and the second synchronous rectifier control signal EN2 is 'logic low'), a control signal for enabling the synchronous rectifier SR Control may be outputted 1110-1. A case when the first and second synchronous rectifier control signals EN1, EN2 are not used may be defined as a 'HIGHZ' state and, in such a case as well, a control signal for enabling the synchronous rectifier may be outputted 1110-2. In the rest of cases (that is, when any one of the first and second synchronous rectifier control signals EN1, EN2 indicates a disabling of the synchronous rectifier), a signal for disabling the synchronous rectifier may be outputted.

The synchronous rectifier control module may comprise the enable signal generator 110 proposed in FIG. 10 and FIG. 11. In this case, the synchronous rectifier control module may perform control/drives/enabling operations for the synchronous rectifier only based on the first and second synchronous rectifier control signals EN1, EN2. However, the present disclosure is not limited to this. The synchronous rectifier control module may control the synchronous rectifier by comprising an additional component in addition to the enable signal generator 1010. Descriptions in this regard will be followed with reference to FIG. 12.

Figure 12:
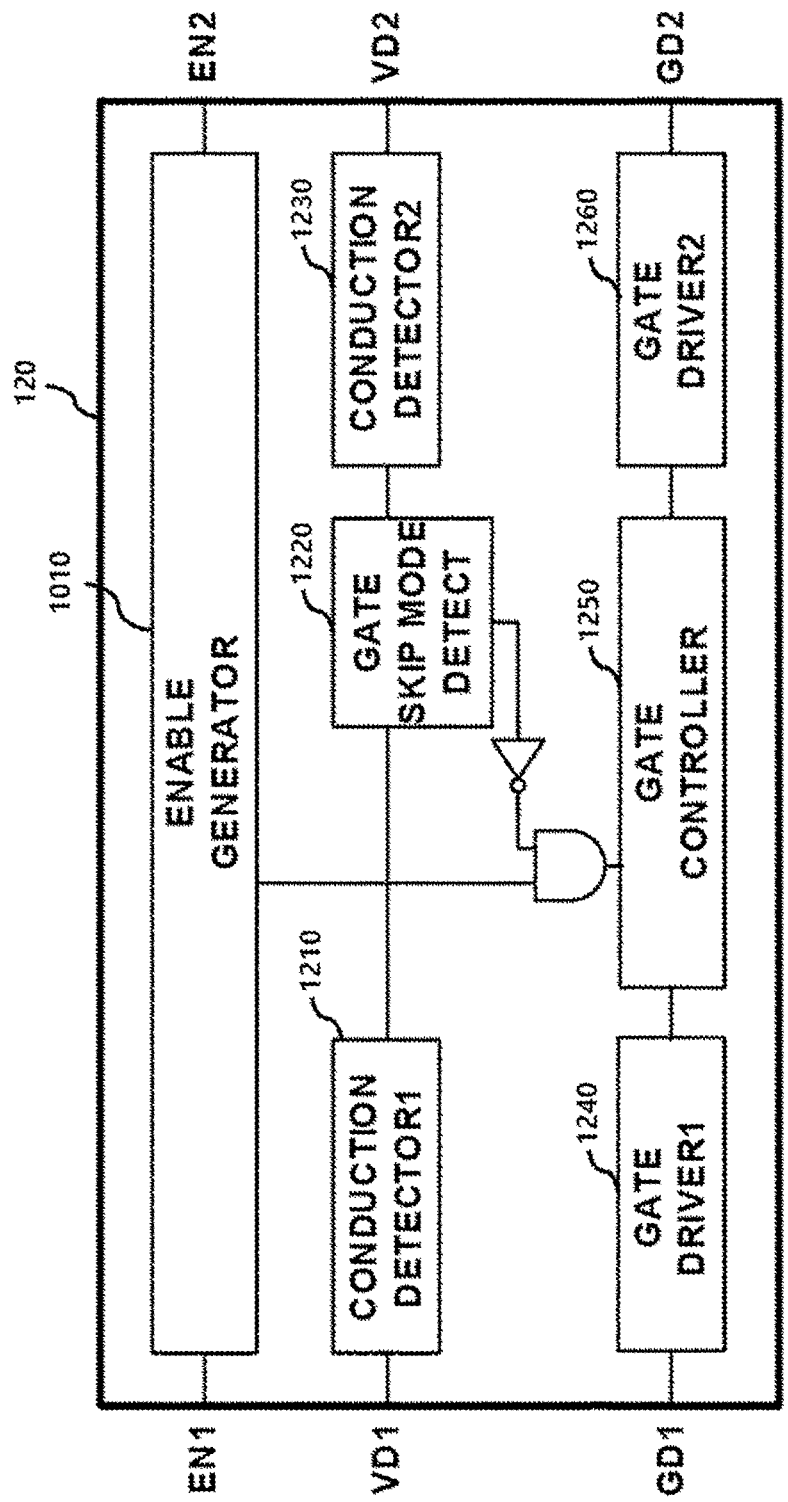
FIG. 12 is a block diagram of a synchronous rectifier control module according to an embodiment of the present disclosure.
Figure 13:
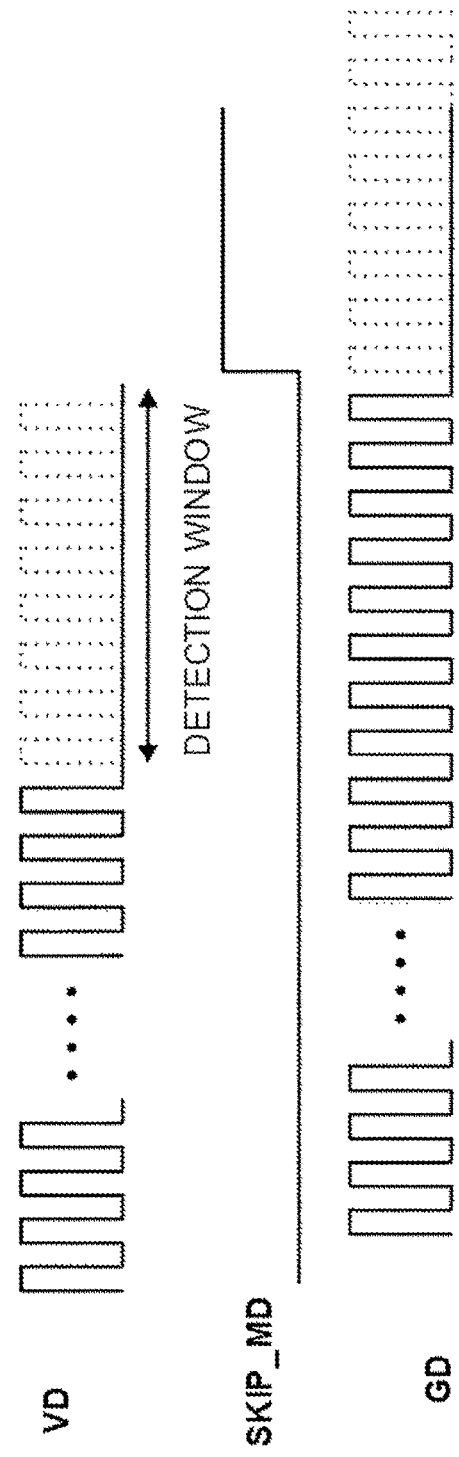
FIG. 13 is a waveform diagram of an operation of a synchronous rectifier control module according to an embodiment of the present disclosure.

FIG. 12 is a block diagram of a synchronous rectifier control module according to an embodiment of the present disclosure and FIG. 13 is a waveform diagram of an operation of a synchronous rectifier control module according to an embodiment of the present disclosure.

The synchronous rectifier control module 120 may comprise components 1210-1230 for monitoring MOSFET drain voltages of the synchronous rectifier in addition to the proposed enable signal generator 1010 so as to control the synchronous rectifier in additional consideration of results of monitoring of the MOSFET drain voltages VD1, VD2 in addition to the first and second synchronous rectifier control signals EN1, EN2.

For this, as shown in FIG. 12, the synchronous rectifier control module 120 may comprise an enable signal generator 1010, a first conduction detector and a second conduction detector 1210, 1230, a gate skip mode detector 1220, a gate controller 1250, and a first and/or a second gate drivers 1240, 1260.

Since descriptions of the enable signal generator 1010 are the same as those with reference to FIG. 10 and FIG. 11, the relevant descriptions will be omitted.

The first and second conduction detectors 1210, 1230 may monitor switching operations by respectively sensing drain voltages VD1, VD2 of a first and a second MOSFETs included in the synchronous rectifier and this allows an indirect monitoring of a switching operation of the LLC control module as to whether the switching operation is normally performed.

The gate skip mode detector 1220 may receive a result of monitoring from the first and the second conduction detectors 1210, 1230 and generate a gate control signal for the first and second MOSFETs based on the result of monitoring.

The gate controller 1250 may generate a gate drive (or enable) or a gate non-drive (or disable) signal GD for the first and second MOSFETs based on the control signal outputted from the enable signal generator 1010 and the gate control signal outputted from the gate skip mode detector 1220.

The first and second gate drivers 1240, 1260 may be connected with the gates of the first and second MOSFETs and may drive or may not drive the gates of the first and second MOSFETs based on the gate drive or the gate non-drive signal received from the gate controller 1250. As the gates of the first and second MOSFETs are driven, the synchronous rectifier may be driven.

Specific control operations of the synchronous rectifier control module 120 on the synchronous rectifier focused on the gate control signal will be described with reference to a waveform diagram of FIG. 13. In a case when, as a result of monitoring of the drain voltages VD1, VD2 received from the first and second conduction detectors 1210, 1230, it is detected that a switching operation of the drain voltages VD1, VD2 of the first and second MOSFETs has not been performed for a predetermined time (DETECTION WINDOW), the gate skip mode detector 1220 may generate a gate control signal SKIP_MD indicating an enabling of a switching skip mode operation (for example, 'logic high'). The gate controller 1250 may receive the gate control signal from the gate skip mode detector 1220. When the received gate control signal SKIP_MD indicates an enabling of the switching skip mode operation, the gate controller 1250 may generate a gate non-drive signal (for example, 'logic low') and transmit/output it to the first and second gate drivers. The first and second gate drivers 1240, 1260 may change the gate drive voltage GD to be '0' according to the gate non-drive signal to stop the drive of the gates of the first and second MOSFETs.

On the contrary, in a case when, as a result of monitoring of the drain voltages VD1, VD2 received from the first and second conduction detectors 1210, 1230, it is detected that the switching operation of the drain voltages VD1, VD2 of the first and second MOSFETs has been performed within the predetermined time (DETECTION WINDOW), the gate skip mode detector 1220 may generate a gate control signal SKIP_MD indicating a disabling of the switching skip mode operation (for example, 'logic low'). The gate controller 1250 may receive the gate control signal SKIP_MD from the gate skip mode detector 1220. When the received gate control signal SKIP_MD indicates a disabling of the switching skip mode operation, the gate controller 1250 may generate a gate drive signal (for example, 'logic high') and transmit/output it to the first and second gate drivers. The first and second gate drivers 1240, 1260 may output the gate drive voltage GD according to the gate drive signal to drive the gates of the first and second MOSFETs.

The synchronous rectifier control module 120 may control/drive/enable the synchronous rectifier in additional consideration of a signal outputted from the enable signal generator 1010 in addition to the gate control signal SKIP_MD.

Specifically, referring to FIG. 12 again, in the synchronous rectifier control module 120, an output of the enable signal generator 1010 and an output of the gate skip mode detector 1220 may pass through the AND logic part and be inputted into the gate controller 1250, wherein an inverter is provided between an output terminal of the gate skip mode detector 1220 and the AND logic part. Here, a synchronous rectifier enabling signal outputted from the enable signal generator 1010 may be set to 'logic high' and the gate control signal SKIP_MD indicating an enabling of the switching skip mode operation may be set to 'logic high'. In this case, the gate controller 1250 may recognize a signal outputted from the AND logic as a final gate control signal and, when the final gate control signal is 'logic high' (that is, the final gate control signal indicates a drive of a gate), generate a gate drive signal. On the contrary, when the final gate control signal is 'logic low' (that is, the final gate control signal indicates a non-drive of a gate), the gate controller 1250 may generate a gate non-drive signal.

According to the present embodiment, only when an enable signal (for example, 'logic high') for the synchronous rectifier is generated/outputted from the enable signal generator 1010 and a gate control signal (for example, 'logic low'), indicating a disabling of a switching skip mode operation, is generated/outputted from the gate skip mode detector 1220, the gate controller 1250 can generate a gate drive signal.

Although respective figures are separately described for the convenience of description, it is also possible to design to implement a new embodiment by combining the embodiments described with respect to the figures. In addition, in the present disclosure, the configurations and methods of the above-described embodiments are not limitedly applied, but all or some of the respective embodiments may be selectively combined for various modifications.

Further, at least one element proposed in the present specification may comprise at least one hardware element (for example, processor, sensor, memory or the like) and/or at least one software element for implementing functions describe in the specification.

Moreover, although preferred embodiments are illustrated and described in the above, the present disclosure is not limited to the above-described specific embodiments, but can be variously modified by a person skilled in the art, to which the present disclosure pertains, without being beyond the purport of the claims. In addition, such modified embodiments should not be understood to depart from the technological idea or the prospect of the present disclosure.

The present disclosure may be used for a synchronous rectifier for a power supply device.

What is claimed is:

1. A resonant converter for a power supply device, comprising:
a synchronous rectifier comprising at least one MOSFET and to convert an alternating current into a direct current;
a circuit isolation device to receive a state signal from a component included in a first circuit module and to generate a first synchronous rectifier control signal based on the received state signal;
a load state detection module to detect a state of a load stage included in a second circuit module and to generate a second synchronous rectifier control signal based on the detected state; and
a synchronous rectifier control module to receive the first and the second synchronous rectifier control signals and to control the synchronous rectifier based on at least one of the first and the second synchronous rectifier control signals,
wherein the first circuit module comprises at least one of:
a full-wave bridge rectifier to rectify an inputted alternating current voltage;
a power factor correction (PFC) power supply module to generate a boosted direct current voltage by using a rectified voltage;
an LLC control module to drive a MOSFET provided in the first circuit module; and
a shunt rectifier to compare the level of an inputted voltage and the level of a predetermined first reference voltage and to output a comparison result,
wherein the shunt rectifier senses the level of an alternating current voltage outputted by the full-wave bridge rectifier and transmits a comparison result of the sensed level of the alternating current voltage with a predetermined first reference voltage level to the circuit isolation device as a state signal, and
the circuit isolation device generates and transmits a first synchronous rectifier control signal indicating a disabling of the synchronous rectifier when the sensed level of the alternating current voltage is lower than the first reference voltage level as the comparison result.

2. A resonant converter for a power supply device, comprising:
a synchronous rectifier comprising at least one MOSFET and to convert an alternating current into a direct current;
a circuit isolation device to receive a state signal from a component included in a first circuit module and to generate a first synchronous rectifier control signal based on the received state signal;
a load state detection module to detect a state of a load stage included in a second circuit module and to generate a second synchronous rectifier control signal based on the detected state; and
a synchronous rectifier control module to receive the first and the second synchronous rectifier control signals and to control the synchronous rectifier based on at least one of the first and the second synchronous rectifier control signals,
wherein the first circuit module comprises at least one of:
a full-wave bridge rectifier to rectify an inputted alternating current voltage;
a power factor correction (PFC) power supply module to generate a boosted direct current voltage by using a rectified voltage;
an LLC control module to drive a MOSFET provided in the first circuit module, the MOSFET being distinct from the MOSFET of the synchronous rectifier; and
a shunt rectifier to compare the level of an inputted voltage and the level of a predetermined first reference voltage and to output a comparison result,
wherein the shunt rectifier senses the level of a voltage outputted by the PFC power supply module and transmits, as a state signal, a comparison result of the sensed level of the voltage with the first reference voltage level to the circuit isolation device, and
the circuit isolation device generates and transmits a first synchronous rectifier control signal indicating a disabling of the synchronous rectifier when the sensed level of the voltage is lower than the first reference voltage level as the comparison result.

3. A resonant converter for a power supply device, comprising:
a synchronous rectifier comprising at least one MOSFET and to convert an alternating current into a direct current;
a circuit isolation device to receive a state signal from a component included in a first circuit module and to generate a first synchronous rectifier control signal based on the received state signal;
a load state detection module to detect a state of a load stage included in a second circuit module and to generate a second synchronous rectifier control signal based on the detected state; and a synchronous rectifier control module to receive the first and the second synchronous rectifier control signals and to control the synchronous rectifier based on at least one of the first and the second synchronous rectifier control signals, wherein the first circuit module comprises at least one of:

a full-wave bridge rectifier to rectify an inputted alternating current voltage;

a power factor correction (PFC) power supply module to generate a boosted direct current voltage by using a rectified voltage;

an LLC control module to drive a MOSFET provided in the first circuit module, the MOSFET being distinct from the MOSFET of the synchronous rectifier; and a shunt rectifier to compare the level of an inputted voltage and the level of a predetermined first reference voltage and to output a comparison result, wherein the LLC control module senses the level of a voltage outputted by the PFC power supply module, compares the sensed level of the voltage with the level of a second reference voltage predetermined inside the LLC control module, and transmits, as a state signal, a signal indicating an abnormal state of the PFC power supply module to the circuit isolation device when the sensed level of the voltage is lower than the second reference voltage level, and the circuit isolation device generates and transmits a first synchronous rectifier control signal indicating a disabling of the synchronous rectifier according to the received abnormal state of the PFC power supply module.

4. The resonant converter of claim 1, wherein, when an LLC switching operation has not been performed for a predetermined time, the LLC control module transmits, as a state signal, a signal indicating an abnormal state of the LLC control module to the circuit isolation device, and the circuit isolation device generates and transmits a first synchronous rectifier control signal indicating a disabling of the synchronous rectifier according to the received abnormal state of the LLC control module.

5. The resonant converter of claim 1, wherein, when detecting an abnormal state, the LLC control module transmits, as a state signal, a signal indicating the abnormal state of the LLC control module to the circuit isolation device, and the circuit isolation device generates and transmits a first synchronous rectifier control signal indicating a disabling of the synchronous rectifier according to the received abnormal state of the LLC control module.

6. The resonant converter of claim 5, wherein the abnormal state comprises at least one of an overheating state, an overcurrent state, and an overvoltage state of the LLC control module.

7. The resonant converter of claim 1, wherein, when detecting an abnormal state, the PFC power supply module transmits, as a state signal, a signal indicating the abnormal state of the PFC power supply module to the circuit isolation device, and the circuit isolation device generates and transmits a first synchronous rectifier control signal indicating a disabling of the synchronous rectifier according to the received abnormal state of the PFC power supply module.

8. The resonant converter of claim 1, wherein, when detecting at least one of a light-load state and an open state, the load state detection module generates and transmits a second synchronous rectifier control signal indicating a disabling of the synchronous rectifier.

9. The resonant converter of claim 1, wherein, when detecting an abnormal state of the load stage, the load state detection module generates and transmits a second synchronous rectifier control signal indicating a disabling of the synchronous rectifier.

10. The resonant converter of claim 9, wherein the abnormal state of the load stage comprises at least one of an overheating state, an overcurrent state, a short-circuit state, and an overvoltage state of the load stage.

11. The resonant converter of claim 1, wherein, when receiving a signal for requesting a disabling of the synchronous rectifier from the load stage, the load state detection module generates and transmits a second synchronous rectifier control signal indicating a disabling of the synchronous rectifier.

12. The resonant converter of claim 1, wherein the synchronous rectifier control module comprises an enable signal generator to receive the first and the second synchronous rectifier control signals and to output a control signal for controlling the synchronous rectifier based on the first and the second synchronous rectifier control signals.

13. The resonant converter of claim 12, wherein the enable signal generator is a logic circuit made to output a signal for enabling the synchronous rectifier only when both the inputted first and second synchronous rectifier control signals indicate an enabling of the synchronous rectifier.

14. The resonant converter of claim 13, wherein, in a case when the first synchronous rectifier control signal indicating an enabling of the synchronous rectifier is set to 'logic high' and the second synchronous rectifier control signal indicating an enabling of the synchronous rectifier is set to 'logic low', the enable signal generator comprises a first circuit path part through which the inputted first synchronous rectifier control signal passes, a second circuit path part through which the inputted second synchronous rectifier control signal passes, and an AND logic part to receive signals outputted from the first and the second circuit path parts.

15. The resonant converter of claim 14, wherein the first circuit path part comprises a pull-up resistor and a Schmitt trigger and the second circuit path part comprises a pull-down resistor, a Schmitt trigger, and an inverter.

16. The resonant converter of claim 12, wherein the synchronous rectifier control module further comprises at least one of a first and a second conduction detectors to respectively monitor switching operations of drain voltages of a first and a second MOSFETs included in the synchronous rectifier;

a gate skip mode detector to receive a result of monitoring from the first and the second conduction detectors and to generate a gate control signal for the first and the second MOSFETs based on the result of monitoring;

a gate controller to generate a gate drive or a gate non-drive signal for the first and the second MOSFETs based on the control signal outputted from the enable signal generator and the gate control signal outputted from the gate skip mode detector; and a first gate driver and a second gate driver to drive or not to drive the gates of the first and the second MOSFETs based on the gate drive or the gate non-drive signal.

17. The resonant converter of claim 16, wherein the gate skip mode detector generates a gate control signal indicating an enabling of a switching skip mode operation in a case when, as a result of monitoring, it is detected that a switching operation of the drain voltages of the first and the second MOSFETs has not been performed for a predetermined time, and when the gate control signal indicates an enabling of a switching skip mode operation, the gate controller generates the gate non-drive signal.

18. The resonant converter of claim 16, wherein, only when an enable signal for the synchronous rectifier is generated from the enable signal generator and a signal, indicating a disabling of a switching skip mode operation, is generated from the gate skip mode detector, the gate controller generates the gate drive signal.

* * * * *